No. 609,642. Patented Aug. 23, 1898.
J. P. WENDT.
PACKING CASE.
(Application filed Jan. 4, 1898.)

(No Model.)

Witnesses
Harry L. Amer
C. E. Hunt

Inventor
Joseph P. Wendt.
by V. D. Stockbridge
his Attorney.

THE NORRIS PETERS CO., PHOTO-LITHO., WASHINGTON, D. C.

UNITED STATES PATENT OFFICE.

JOSEPH P. WENDT, OF PHŒBUS, VIRGINIA.

PACKING-CASE.

SPECIFICATION forming part of Letters Patent No. 609,642, dated August 23, 1898.

Application filed January 4, 1898. Serial No. 665,505. (No model.)

*To all whom it may concern:*

Be it known that I, JOSEPH P. WENDT, a citizen of the United States, residing at Phœbus, in the county of Elizabeth City and State of Virginia, have invented certain new and useful Improvements in Packing-Cases; and I do hereby declare the following to be a full, clear, and exact description of the invention, such as will enable others skilled in the art to which it appertains to make and use the same.

This invention relates to a novel packing-case designed particularly for the packing of soda, beer, or other bottles, the object being to provide a case of this character with rungs which may be readily or freely withdrawn from the box without taking the latter apart and with a detachable bottom which may be quickly removed when it is desired to cleanse the case.

To the accomplishment of these objects the invention consists in providing a rectangular box with longitudinal series of rung sockets or recesses in one of the side and end walls and with corresponding apertures through the opposite side and end walls and with detachable cover-plates designed to be secured to the apertured walls and to prevent the removal of the rungs which are passed through the apertures and have their opposite ends seated in the sockets or recesses.

The invention consists, further, in certain novel mechanism by means of which the bottom of the case is detachably secured.

Figure 1:
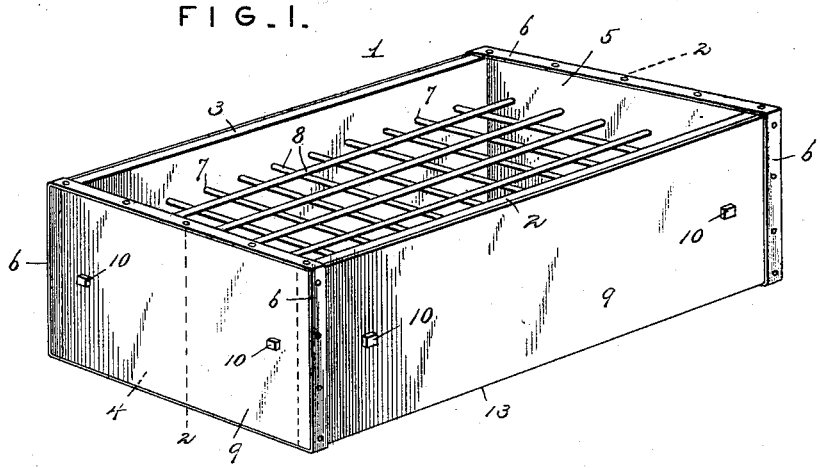
Figure 2:
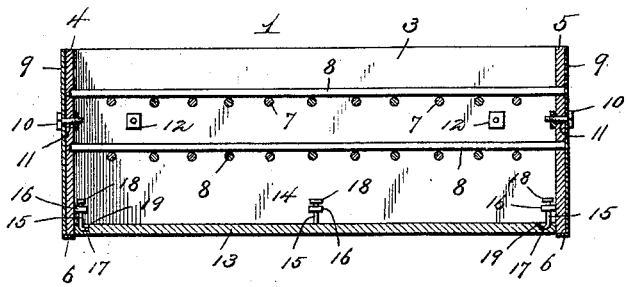
Figure 3:
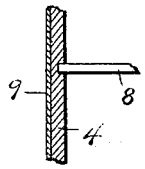
Figure 4:
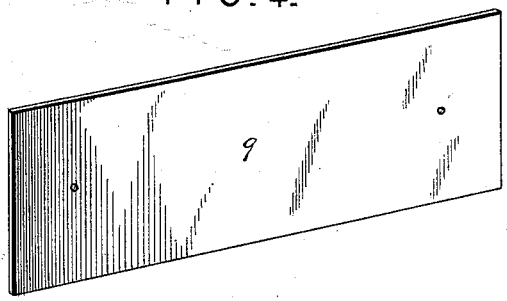
Figure 5:
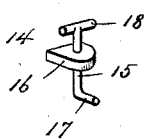

Referring to the drawings, Figure 1 is a perspective view of my packing-case complete. Fig. 2 is a transverse section on the line 3 3. Fig. 3 is a section showing recesses or sockets in one end of the box extending part of the way through the side wall. Fig. 4 is a detail perspective view of one of the cover-plates, and Fig. 5 is a detail view of the bottom latch.

Referring to the numerals on the drawings, 1 indicates my case, which is preferably of rectangular form and is composed of the side walls 2 and 3 and the end walls 4 and 5, connected in any suitable manner, but preferably by iron bands or straps 6, nailed along the top and end edges of the walls. The side wall 3 and end wall 5 are provided, respectively, with rows of rung sockets or recesses 7 and the side and end walls 2 and 4 are provided with rung apertures or perforations corresponding to the rung-sockets in the opposite wall, and 8 indicates rungs passing through the apertures and having their opposite ends seated within the socket 7, the extremities of said rungs when in place being substantially flush with the outer faces of the perforated walls. In order to secure the rungs securely in place, I provide cover-plates 9, designed to be secured upon the apertured walls, any suitable means being provided for securing the plates in place—as, for instance, securing bolts 10, projecting from the plates 9, through bolt-apertures 11 in the walls 3 and 5 and provided upon their threaded extremities with nuts 12, which when the cover-plates are in place are screwed up against the inside of the walls.

13 indicates the bottom of the case, which is preferably secured in place by a bottom latch 14, preferably consisting of a rotary spindle 15, carried by a lug 16, projecting from one of the side walls and provided upon its lower end with a catch 17 and upon its upper end with a handle 18. When it is desired to attach the bottom, the catch 17 is turned into alinement with a longitudinal slot 19 through the bottom 13, and the said bottom having been pressed against the lower edges of the walls of the case the bottom latch is rotated so as to bring the catch end 17, which is passed through the slot, in a position at right angles thereto, thus securely fastening the bottom in place, but permitting its ready detachment by rotating the latch in a manner which will be obvious.

When it is desired to remove the rungs, it is simply necessary to detach the cover-plates by removing the nuts 12 and drawing the rungs through the rung-apertures, and when it is desired to remove the bottom for the purpose of washing the case it is accomplished by rotating the bottom latch in the manner specified.

It will thus be seen that I have produced a simple and ingenious packing-case by means of which the rungs will be securely held in place or may be withdrawn without disorganizing the case proper; but while the construction illustrated and described appears at this time to be preferable I do not desire to limit myself to the structural details set out, but reserve the right to change, modify, or vary them at will within the scope of my invention.

What I claim is—

A packing-case for bottles involving a box or vessel having perforations or passages through one side and one end, recesses or sockets in the opposite side and end, readily-removable rungs or rods, and cover-plates detachably connected with the perforated side and end, substantially as described.

In testimony whereof I have signed this specification in the presence of two subscribing witnesses.

JOSEPH P. WENDT.

Witnesses:
GOTTLOB KENEKER,
PETER WAGNER, Jr.